Feb. 1, 1938.   A. W. CHAPMAN   2,106,994
PHYSICAL EXERCISER
Filed April 1, 1937
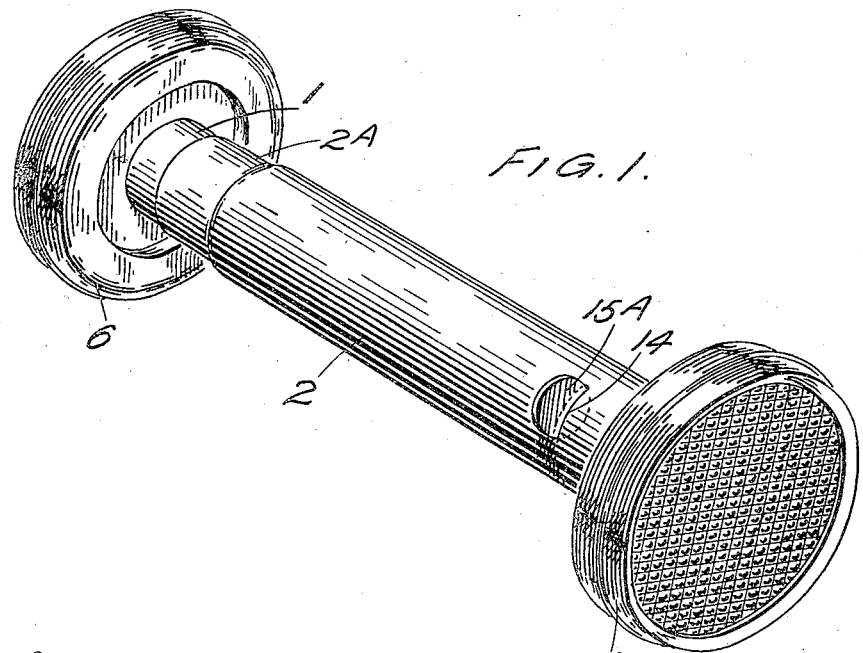
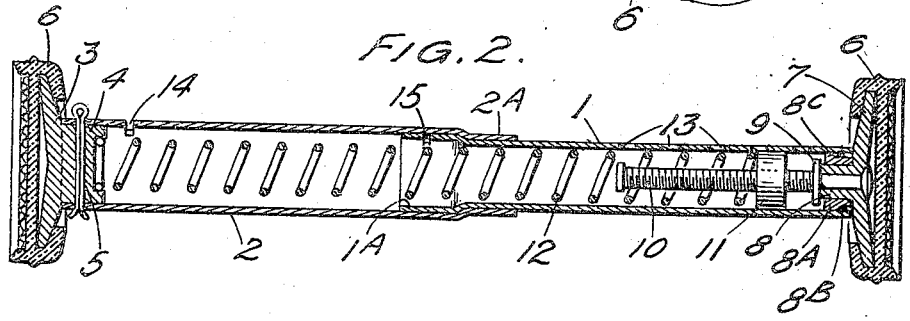
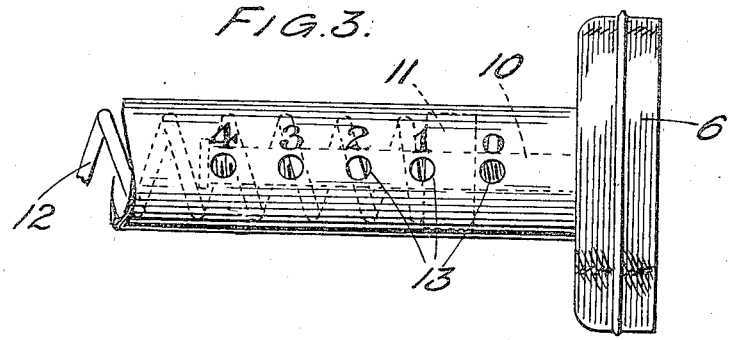
Inventor,
Arthur W. Chapman Patented Feb. 1, 1938

2,106,994

UNITED STATES PATENT OFFICE 2,106,994

PHYSICAL EXERCISER

Arthur William Chapman, London, England

Application April 1, 1937, Serial No. 134,420
In Great Britain April 15, 1936

6 Claims. (Cl. 272—57)

The invention relates to physical exercisers for human use, and seeks to provide in a single device means whereby a large variety of beneficial exercises for the body and limbs may be carried out. An object of the invention is to provide an exerciser usable by compression between the hands or parts of the body or limbs. A further object is to provide such an exerciser with a degree of adjustability so that as the user's physique improves the effort he has to exert may be increased. Again, an object is to provide simple means whereby the adjustment at the time being may readily be observed. A minor object is to provide locking means for transport or storage of the device, and other objects will become apparent, more especially in relation to economical and convenient constructional features, from the following description of an example of the invention, with the aid of the accompanying drawing, in which:—

Figure 1 is a perspective view of an exerciser;

Figure 2 a longitudinal section; and

Figure 3 an enlarged external view showing detail.

In this example the exerciser comprises an internal telescopic tube 1, slidable within an external tube 2. At their adjacent ends these tubes are swaged or formed respectively outwardly and inwardly at 1A and 2A, to prevent their coming apart. The end of the tube 2 is closed by a disc-like plate 3 with a spigot 4 secured in the end of tube 2 by a split pin 5 or other appropriate means. Upon the disc 3 is sprung a rubber cap 6 for comfort and convenience in handling. The end of the tube 1 carries rotatably a somewhat similar plate 7 with another rubber cap 6, and the spigot 8, integral with the plate 7, projects through a bush 8A and is retained by a washer 9 with axial clearance from the bush 8A. In a groove in the tube 1 is a circlet 8B which meets a shoulder 8C formed by turning down the bush. Axially fixed through the plate and spigot 7, 8, and inwardly protruding is a square-threaded stem 10 on which there is screwed a cylindrical nut 11. Between the nut 11 and the spigot 4 is a compression spring 12. The position of the nut 11, which may be peripherally marked to facilitate observation is visible by means of a series of holes 13, which may be marked with numbers for purpose of ascertaining arbitrarily the resistance to be expected from the spring 12. These numbers may actually correspond with the spring resistance in pounds. There is formed in the wall of the tube 2 a circumferential slit 14 which is adapted to register with a like slit 15 in the part 1A of tube 1. The slits enable the tubes to be locked in contracted position by the insertion for example of a coin 15A, this facilitating storage or transport. It is intended that the exerciser so formed be used by alternate compression and relaxation against the resistance of the spring 12, the initial compression of which is of course adjusted by rotating the plate 7 and its setting being ascertained through the holes 13.

What I claim is:—

1. A physical exercising device comprising tubes arranged as a telescopic system, a spring housed therein to extend the system, and grips mounted on the opposite ends of the system to facilitate compression thereof, and screw means for adjusting the spring by rotating an element associated with one of said grips.

2. A physical exercising device comprising a first tube, a second tube slidable outside the first tube, complementary stop means on said tubes to prevent separation thereof, a compression spring housed by said tubes, an end grip attached to one tube, a second end grip attached to the other tube, a threaded element rotatably associated with said second grip, and a nut on said element forming an adjustable abutment for said spring.

3. A physical exercising device comprising tubes arranged as a telescopic system, a spring housed therein to extend the system, and internal means for adjusting initial load of the spring, rendered visible by aperturing a tube of said system.

4. A physical exercising device comprising a first tube, a second tube slidable outside the first tube, complementary stop means on said tubes to prevent separation thereof, a compression spring housed by said tubes, an end grip attached to one tube, a second end grip associated with rotatable means attached to the other tube, a threaded element rotatable with said rotatable means, and a nut on said element forming an adjustable abutment for said spring, said nut being visible through apertures in one tube.

5. A physical exerciser comprising an outer metal tube swaged in at one end, an inner tube slidable in said outer tube and swaged out to abut against said end, a padded grip attached to the outer end of one tube, a second padded grip carried by and movable with respect to the remote end of the other tube, a compression spring housed by said tubes, a nut forming an endwise abutment for one end of said spring and rendered visible by perforations in one tube, and a threaded stem for operating said nut.

6. An exerciser according to claim 1, having locking means consisting in a removable abutment inserted in openings in said tubes designed to register in the fully contracted relation of the tubes.

ARTHUR WILLIAM CHAPMAN.